United States Patent [19]

Ukmar et al.

[11] E Re. 29,721

[45] Reissued Aug. 8, 1978

[54] PLASTIC BAG AND A PROTECTIVE CONTAINER THEREFOR AND A FIXTURE FOR SECURING THE BAG IN THE CONTAINER

[75] Inventors: Luigi Ukmar; Mario Agostini; Gianfranco Bellandi, all of Milan, Italy

[73] Assignee: Montedison S.p.A., Milan, Italy

[21] Appl. No.: 830,900

[22] Filed: Sep. 6, 1977

Related U.S. Patent Documents

Reissue of:

[64] Patent No.: 3,904,084
Issued: Sep. 9, 1975
Appl. No.: 397,417
Filed: Sep. 14, 1973

[30] Foreign Application Priority Data

Sep. 20, 1972 [IT] Italy ..... 29432 A/72

[51] Int. Cl.[2] ..... B65D 33/14

[52] U.S. Cl. ..... 222/105; 220/403; 222/183; 222/530

[58] Field of Search ..... 206/525; 222/460, 461, 222/105, 107, 183, 527, 530; 229/14 B, 14 BA, 14 BE; 220/63 R

[56] References Cited

U.S. PATENT DOCUMENTS

| | | | |
|---|---|---|---|
| 2,899,109 | 8/1959 | Shorkey | 222/530 X |
| 3,087,654 | 4/1963 | Moore | 222/105 X |
| 3,157,341 | 11/1964 | Nelson | 229/14 B |
| 3,172,570 | 3/1965 | Lipshutz | 222/105 |
| 3,696,952 | 10/1972 | Bodenheimer | 229/14 B X |

FOREIGN PATENT DOCUMENTS

| | | | |
|---|---|---|---|
| 2,532,820 | 7/1975 | Fed. Rep. of Germany | 206/525 |

*Primary Examiner*—Robert B. Reeves
*Assistant Examiner*—David A. Scherbel
*Attorney, Agent, or Firm*—Stevens, Davis, Miller & Mosher

[57] ABSTRACT

A package for bulk materials having a box-like protective container and a plastic bag liner, and means for securing the bag in the container by a triangularly shaped flap formed by a fold of the bag wall, said means comprising a channel member and an elongated metal strip adapted to be secured in the groove of the channel member and secure the flap therebetween, said bag also having triangularly shaped flaps for filling and emptying the bag.

9 Claims, 11 Drawing Figures

PLASTIC BAG AND A PROTECTIVE CONTAINER THEREFOR AND A FIXTURE FOR SECURING THE BAG IN THE CONTAINER

Matter enclosed in heavy brackets [ ] appears in the original patent but forms no part of this reissue specification; matter printed in italics indicates the additions made by reissue.

The present invention relates to a plastic bag adapted to be inserted in a protective container and to a means for securing the bag to the wall of the container to provide a package suitable for transporting granular materials in bulk and more particularly to such a package which is well adapted for stoking of the material therein and for charging and discharging bulk material.

In order to transport large quantities of materials in bulk to reduce packaging costs, it has been suggested to transfer solid products in bulk in a plurality of large collapsible plastic bags arranged in containers codified according to "ISO" rules, that is into the well known "containers". The filling of these big bags, after they have been placed in the container, is achieved by gravity flow of material through an opening in the top of the container and from which a tubular appendage welded to the bag protrudes.

This system has various disadvantages including the substantial cost of the big bag and above all the necessity to dispose of special containers that in general are not available on the market.

Systems for filling a bag through one of its ends in communication with the rear end of the usual containers have also been tried but difficulties have been experienced in filling the bag and in discharging the contents from a filled bag because of bridging of the material in many zones of the bag. Such bridging impedes gravity flow of the bulk product from the bag.

Thus, an object of this invention is to provide a special bag and suitable means for fitting the bag in a container which avoid the disadvantages of the prior art. Another object of the invention is to provide a relatively inexpensive plastic gag and an inexpensive means for fitting the bag in a container which meets the ISO standards.

A further object of this invention is to provide a bag fastening means that may be used on any type of container having a rear door which functions perfectly during the transport of the container as well as during the loading and unloading of the bulk product.

The foregoing objects and others are accomplished in accordance with this invention, generally speaking, by providing a large plastic gag adapted to contain bulk granular material and to be secured inside a protective container. The invention provides a tubular plastic bag welded at each end so as to form a pair of triangular shaped folds or flaps at each end of the bag. The invention also provides an anchor means for securing the bag by one of its triangularly shaped flaps to an inside wall of the bottom wall or floor of the protective container. This anchor means may be a channel member for winding one of the flaps thereabout and means for pressing a portion of the flap into the groove of the channel to secure the wound flap. A pair of relatively short channel members are anchored to opposite inner walls of the container and the ends of the channel member having the bag flap wound thereabout are inserted in the anchored members to secure the bag in the protective container. This anchoring means may be used to secure the flap to be used as the discharge opening when the bulk material is to be unloaded from the bag. A series of sealing means is arranged so as to form a grid or grating immediately behind the front door of the container and provided with slots for the flaps used to load and to unload the bag. A transverse bar is fittable above said grating and the loading flap is wound about the bar after loading has been completed. A conventional feeding hopper or similar means is fixed with a tight fit to the loading flap in order to permit the unloading of the material with the front door open and the container slanting at about 45° with respect to the horizontal plane.

A preferred embodiment of the invention will now be described in more detail with reference to the accompanying drawing for the purpose of illustration without limiting the invention wherein.

Figure 1:
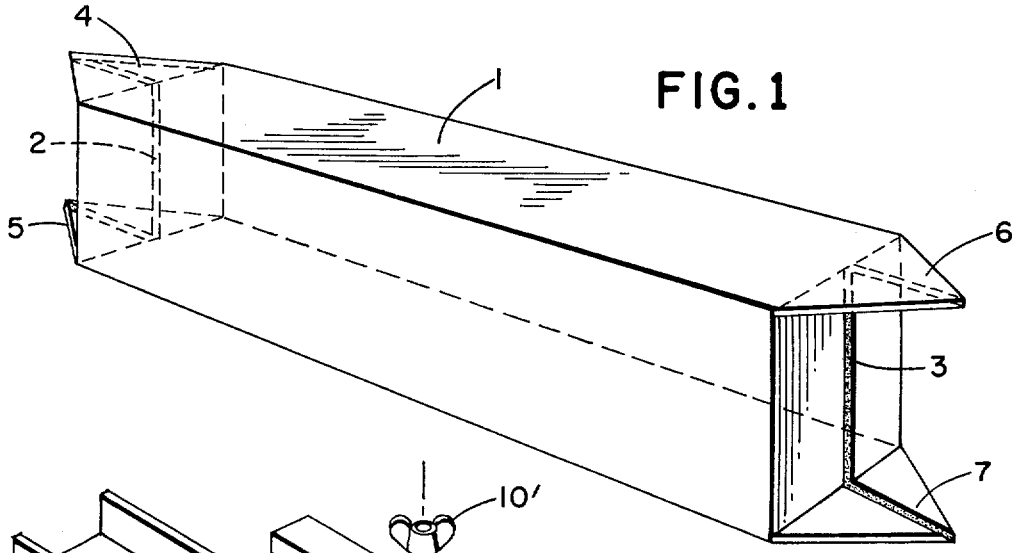
FIG. 1 is a schematic perspective view of one embodiment of a big plastic bag having four triangular flaps provided by the invention.

The present invention, as already indicated, provides a combination of the plurality of elements and/or devices individually represented in the drawing and is particularly suited, but not exclusively, for the transport in large containers of powdery and/or granular bulk material.

Said equipment thus consists of a single bag 1 (FIG. 1), obtained from an extruded tubular thermoplastic material, preferably of polyethylene, having an average thickness of 0.20 mm. This bag is formed from a tube by welding the two ends 2 and 3 thereof. The weld lines are parallel to each other and lie in a plane substantially perpendicular to the generating line of the tube. The tube is stretched while it is being welded. In this way the dimensions of the bag will be defined by the distance between the opposite weld lines 2 and 3 and by the circumference of the tube.

Bag 1, once introduced into the container, will assume after it is filled, the parallelepiped shape of the container itself and will present at its two ends two pairs of triangular shaped flaps 4, 5 and 6, 7 on planes perpendicular to weld lines 2 and 3.

One pair of triangular flaps, for instance those on the same plane indicated as 5 and 7 in the drawing, are used, respectively, to anchor the bag to the floor of the container and for discharging the contents from the bag when the container is tilted, for example, at about 45°. Flap 6, on the other hand, will form the charging means for loading bulk material into bag 1.

Figure 2:
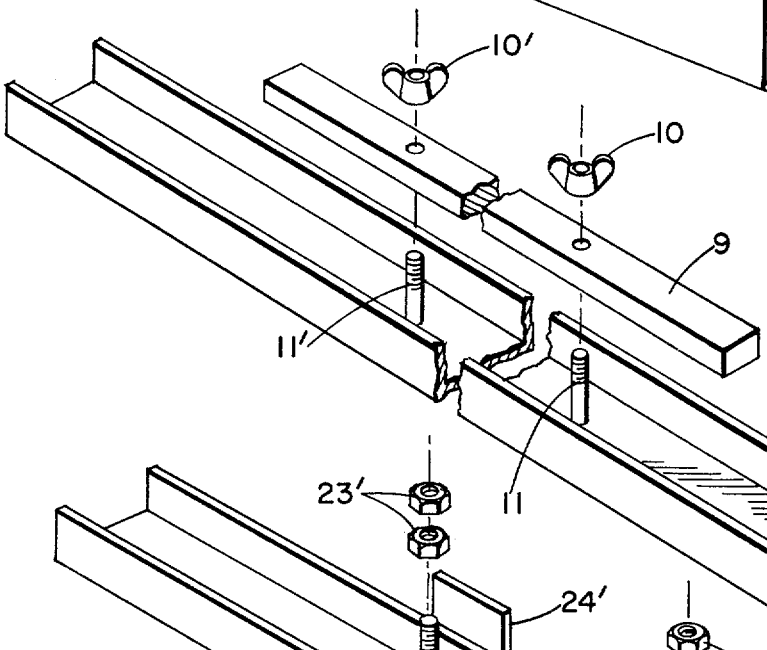
FIG. 2 is a perspective view of an embodiment of a means for anchoring the bag of FIG. 1 to the floor of the container.

The anchoring of bag 1 in the container is achieved by means of the bar of FIG. 2 consisting of a metal profile or channel member 8, having a "U" shaped cross-section in whose longitudinal groove is fitted a rod 9 fixed thereto by two wing nuts 10 and 10' and their respective screws 11 and 11'. For example, flap 5 is wound around channel member 8 between the two screws 11 and 11' and then clamped on channel member 8 by rod 9 by means of wing nuts 10 and 10'.

Channel 8, with the flap of the bag wound thereabout is then fixed to the floor of the container by restraining its two ends into two U shaped angle irons or channels 12 (FIGS. 4–5–6) welded or otherwise secured at points 13 (FIG. 6) to the base of the opposing walls of a container (generically indicated by 14 in FIGS. 4–6 and 10). The groove of each angle iron is turned towards the rear wall of the container 14 in order to retard slip of channel member 8 and bag 1 while the container is tilted.

Figure 9:
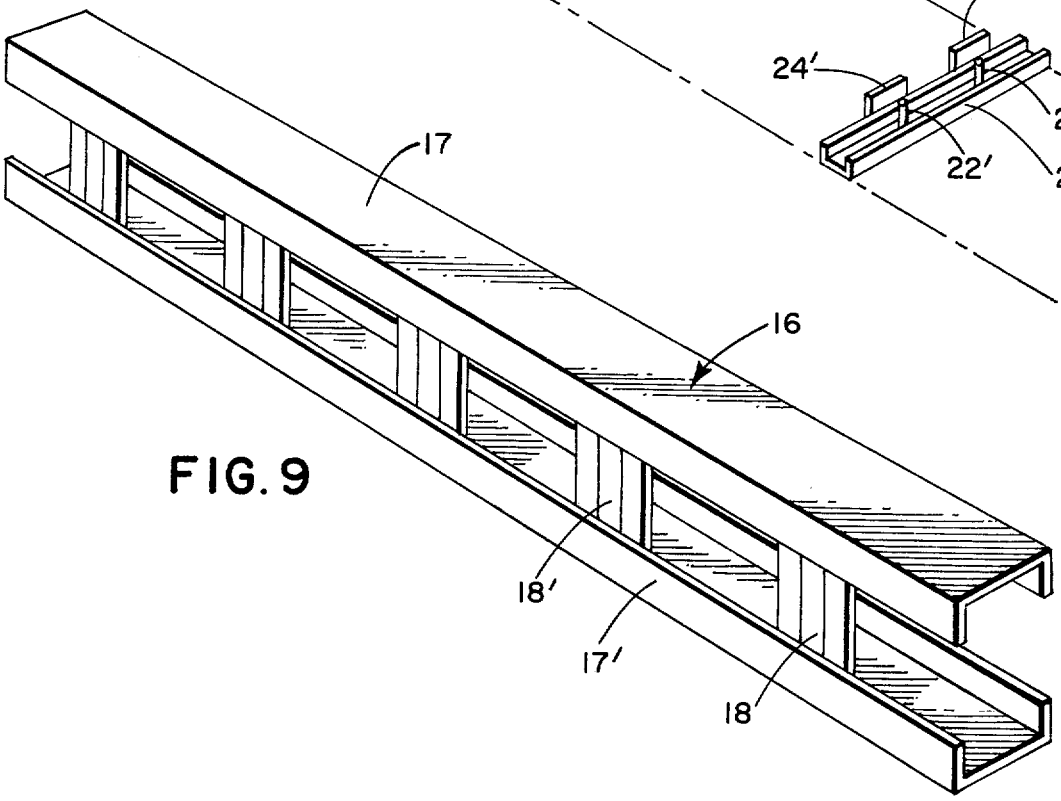
FIG. 9 shows one of the elements that may be used for forming the grating of FIG. 8.
Figure 8:
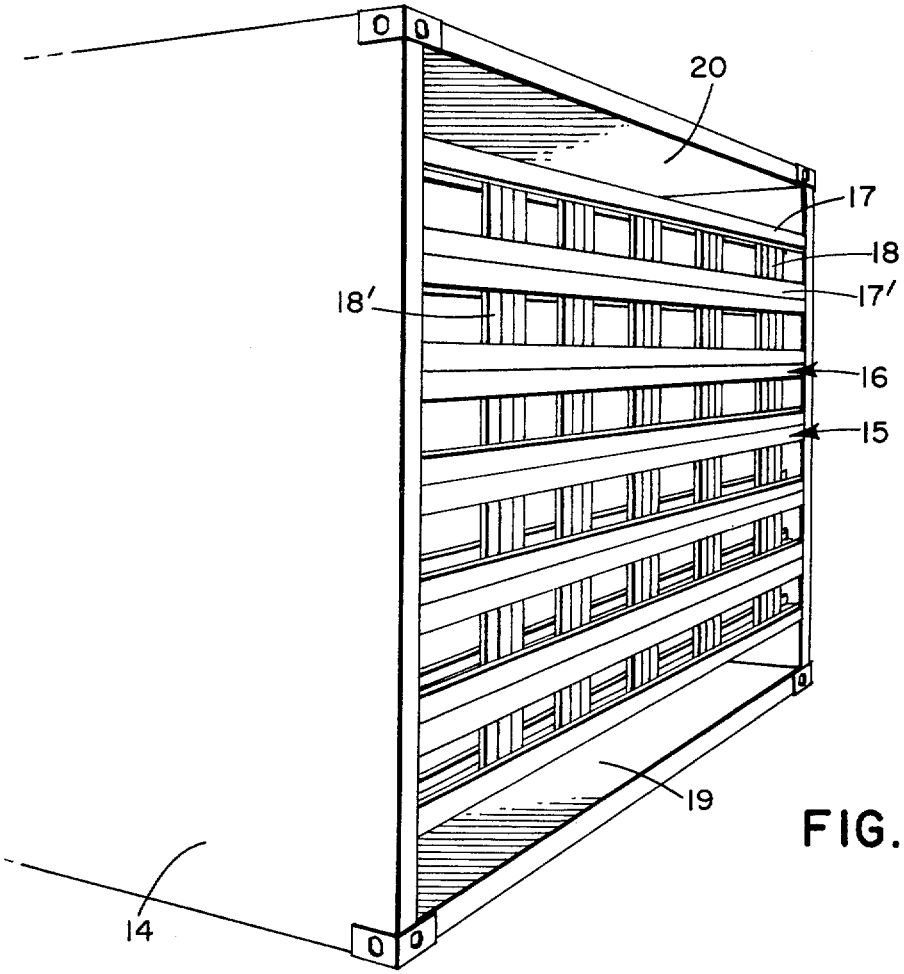
FIG. 8 shows in a perspective view the series of elements forming a grid or grate in the vertical position.
Figure 10:
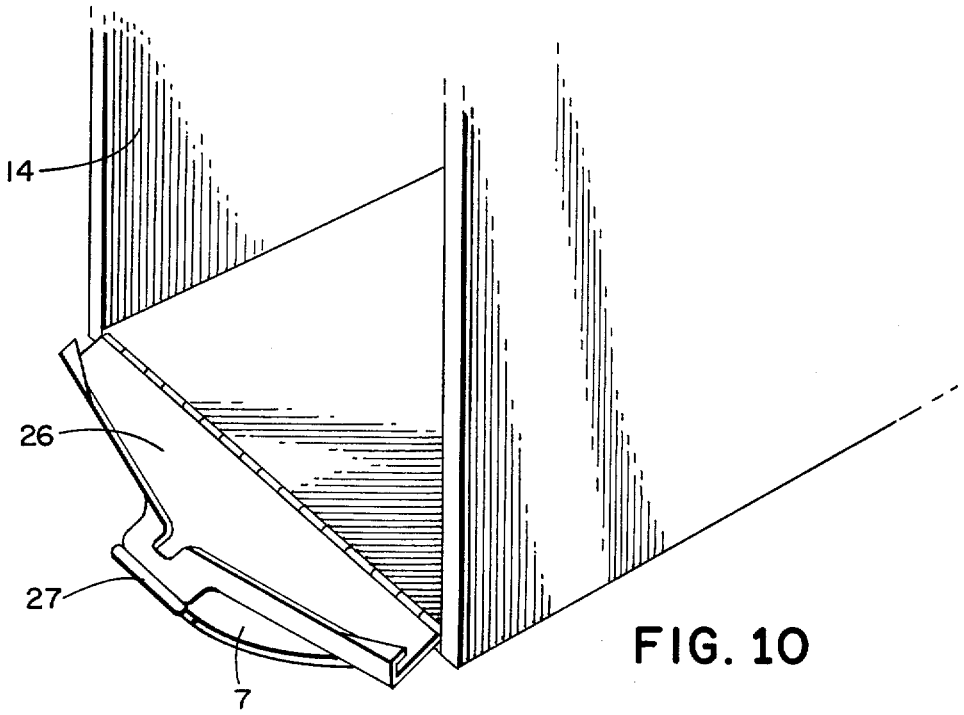
FIG. 10 shows schematically the known hopper-shaped device with tight-fitting ring for the discharge of the material from the container.

Still for retaining the product during the loading period and above all during the unloading period while the container is tilted or inclined, there is provided a grid or grating device 15 (FIG. 8) which is formed of composable metal elements 16 (FIG. 9). These various elements 16 consist of pairs of "C" shaped profile irons 17, 17' etc. with a length corresponding to the front end opening of the container and spaced from each other by cross-members 18, 18' etc. (FIGS. 8 and 9). This grate-like element of FIG. 8 is achieved by inserting the various profile irons 16 into suitable guides provided on uprights (not represented in the drawing) added and fixed with bolts or the like to the head uprights (discharging side) of the container.

This grate assembly, once put into place, leaves a rectangular clearance 19 towards the floor of the container into which flap 7 protrudes and a similar clearance 20 at the upper part of the grating towards the top of the container into which flap 6 protrudes.

Figure 3:
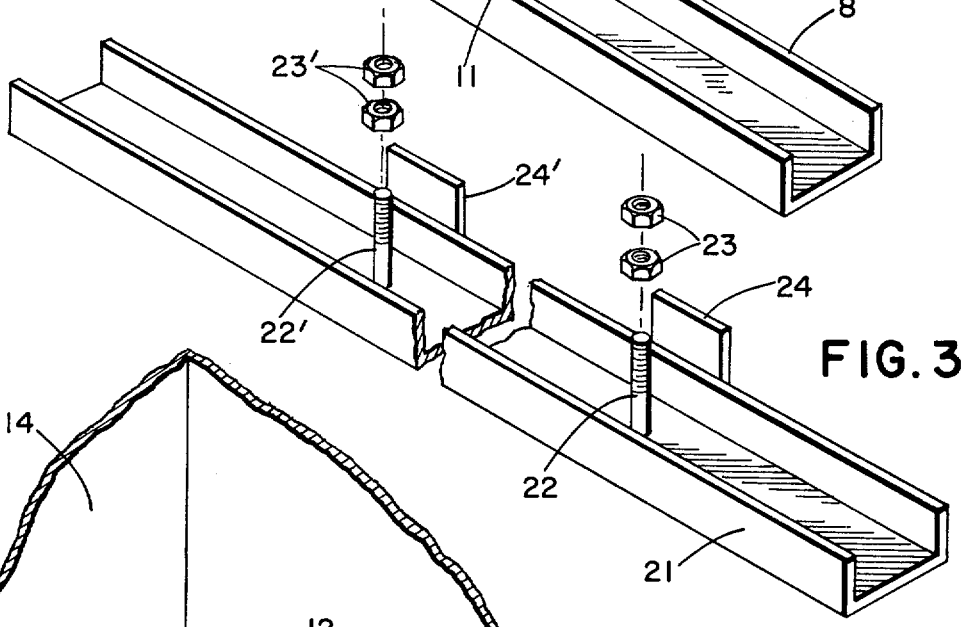
FIG. 3 illustrates schematically a means for prefixing another triangularly shaped flap of the bag to the container floor.
Figure 4:
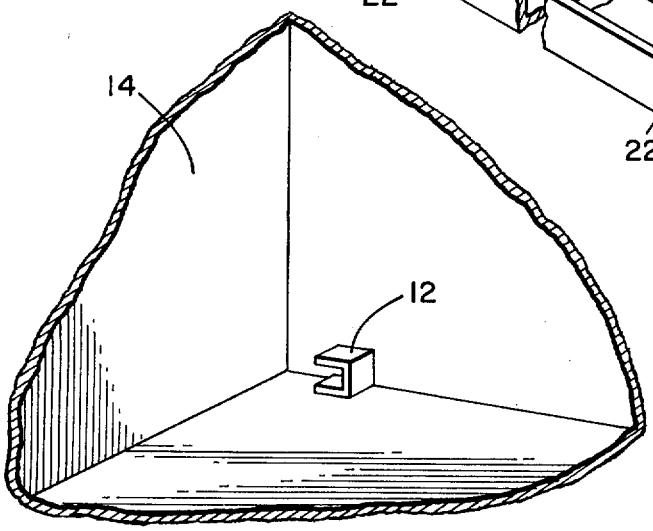
FIGS. 4, 5 and 6 illustrate means for securing the ends of the channel members of FIGS. 2 and 3 to the container.
Figure 5:
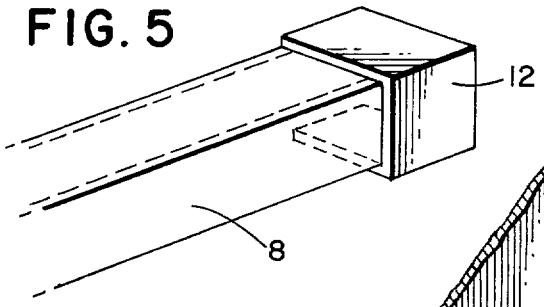
Figure 6:
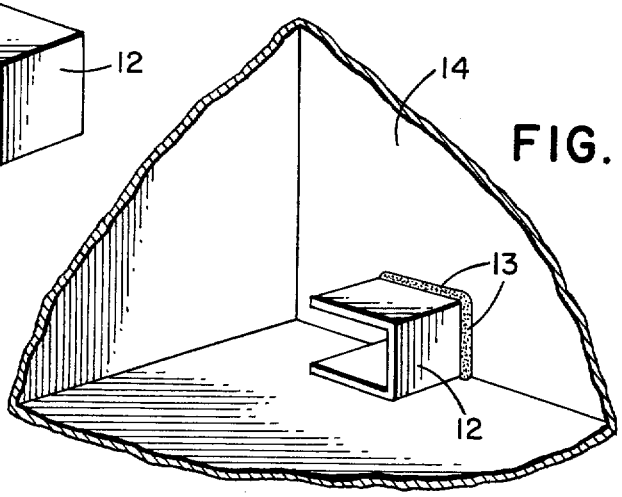

As is illustrated by FIG. 8, the grate assembly is arranged inside the container immediately behind the front door of the same. Between the last element of the grate assembly and the container floor, according to the invention there is provided a pressure device (FIG. 3) consisting of a C shaped metal profile iron 21 from the groove of which project two screw bolts 22 – 22' with corresponding locking nuts 23 – 23'. Side plates 24 – 24', projecting from the profile iron on the internal side of the container protect the bag from damage during fastening or unfastening of the screw bolts.

This pressure device confines the loading flap 7 of the bag between the floor and the underside of the profile iron 21 by forcing iron 21 by means of the bolts and nuts between the last profile of grating 15 and the floor of the container.

The function of this pressing device is that of preventing the product contained in the bag from flowing out or in form pockets or "bridges" in the material which may interfere with discharge of material as the bag is filled.

This pressing device is put into operation immediately before starting the loading operations and obviously is removed when unloading.

Figure 7:
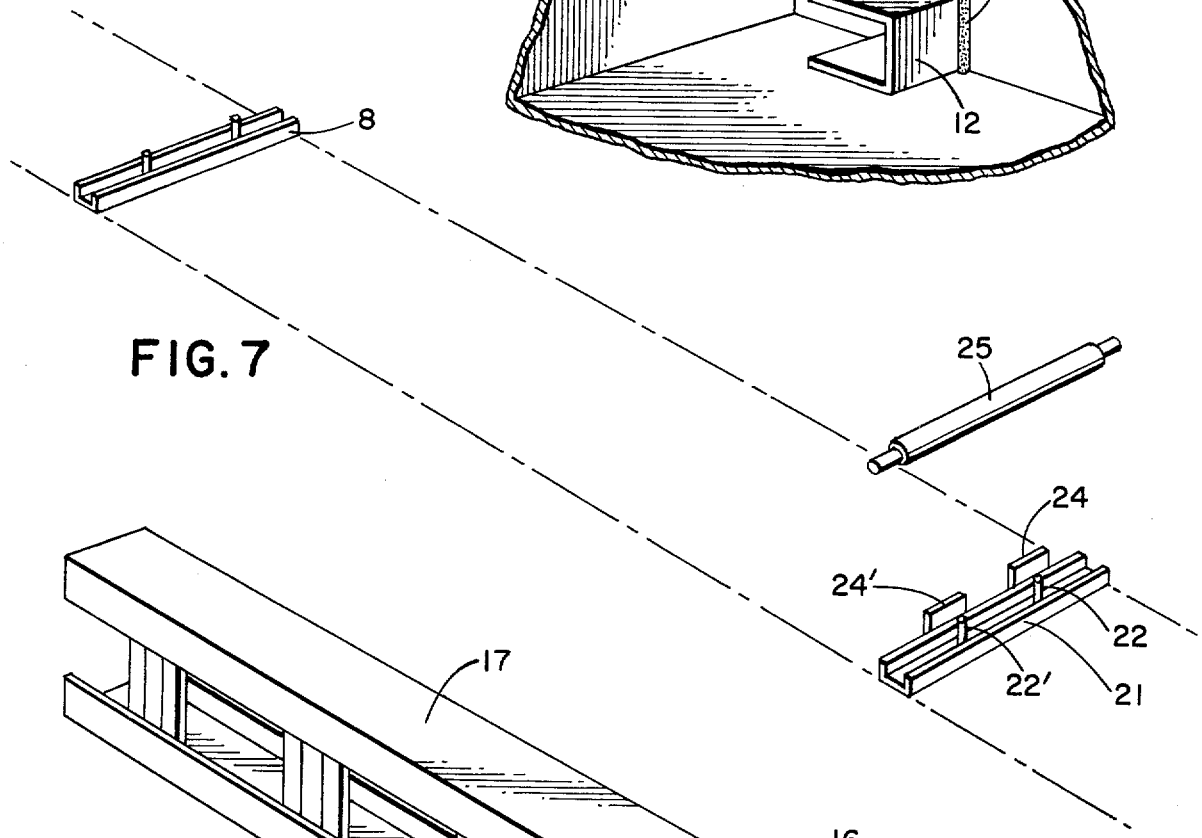
FIG. 7 shows in a schematic way the relative position of the mounted devices of FIGS. 2 and 3.

In FIG. 7 the relative positions of the anchoring channel 8 (rear end of the container), of pressing bar 21 on the door end of the container, and of the upper bar 25 are illustrated schematically.

Triangular flap 6 of the bag, after the bag has been filled, is wound around bar 25 (FIG. 7) which is then fixed above grating 15 in order to hinder the unwinding of the triangular flap and the possibility of contamination of the product.

The positioning of bar 25 is achieved by inserting its two opposite ends into two U shaped brackets (not represented) welded flash to the upper part of the door.

The package provided by the invention thus consists of a plurality of components, more particularly of a special large plastic bag and of different means for the arrangement of the bag in a container, and also, for facilitating the flowing down of the product through the unloading triangular flap 7 (FIG. 1), of a discharging hopper 16 (FIG. 10) for the guidance of flap 7 during the positioning thereof. The hopper is hinged at the base of the frame of the container, having at its terminal part a sleeve-like or annular inflatable sealing device 27 suitable for being connected to known unloading systems such as rotocells and the like.

Figure 11:
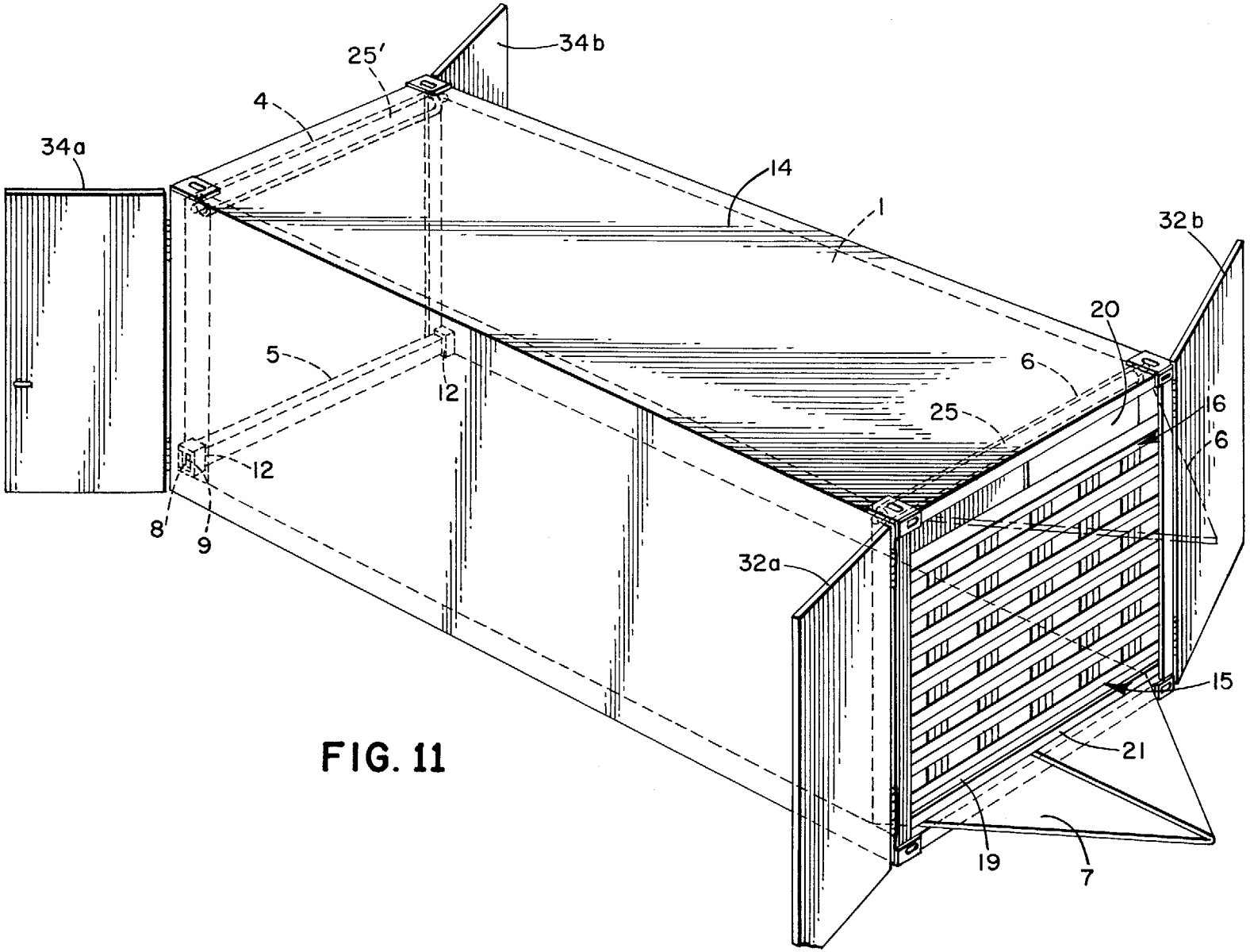
FIG. 11 is a perspective view illustrating the bag of FIG. 1 in a container of the type illustrated in FIG. 8.

A complete assembly of the bag in container 14 is illustrated in FIG. 11. This container has front end doors 32a and 32b and rear end doors 34a and 34b. Rod 25' is similar to the rod 25 illustrated in FIG. 7. Flap 4 is wound around rod 25'. Flap 6 is to be wound about rod 25 after the bag has been filled and is then fixed above the grating 15.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A large plastic bag adapted to contain granular material and disposed in a protective container having front and back doors and a floor, said bag being closed by weld lines at each end and folded to form a pair of oppositely disposed triangularly shaped integral flaps projecting outwardly from the said end; means for anchoring a first flap to the floor of the container comprising a channel member having said flap wound thereabout and means for pressing the wound flap against said channel member, means carried by said container for securing the channel member and said flap pressed thereagainst to the floor of the container; a second flap at the opposite end of the bag in the same plane as the first flap and adapted for emptying the bag; means for securing the second flap to the floor of the container adjacent to the front door of the container while the bag is being loaded and is storing bulk material, a third flap on the same end of the bag as the emptying flap, a series of elements arranged to form a vertical grating in the container immediately behind the front door and provided with a clearance through which loading and unloading flaps project, a cross-bar inserted above the grating for retaining the flap used for loading the bag and means comprising a hopper secured to the unloading flap for unloading the bags contents when the door is open and the container is inclined from horizontal.

2. The product of claim 1 wherein the said plastic bag has been obtained by welding an extruded tubular film at spaced points to form two ends, the two welds being parallel to each other and perpendicular to the generating line of the tube; said tube having been under tension while it was welded to form a pair of triangularly shaped flaps at the opposite ends of the bag.

3. The product of claim 1 wherein the said channel member for the anchoring of one flap to the floor of the container has a substantially U-shaped cross-section, said triangle is wound thereabout, and a pressure rod is secured in the longitudinal groove of the channel member by means of screws and wing nuts, the ends of said channel member being inserted into two profiled angle irons fixed to the opposite walls of the container.

4. The assembly of claim 1 wherein the means for anchoring the discharging flap consists of a substantially U-shaped member and screws and nuts adapted for locking the discharge flap between the floor and the last element of the grating and, adjacent each screw and on the inner side of the container, a protecting plate suitable for preventing damage to the bag during the tightening of the screws.

5. The assembly of claim 1 wherein the elements forming said grating consist of metal rod-like profile irons insertable by their ends into vertical guides on uprights fixed to the front uprights of the container.

6. The assembly of claim 1 wherein said loading flap is wound about and fixed on a bar whose ends are insertable into seats provided for that purpose above the grating.

7. A container for bulk material comprising a protective box having front, rear, top, bottom and sidewalls and a plastic bag liner, said bag having closed ends each with a pair of triangularly shaped folds extending as flaps and integral with the bag wall, a first flap being adapted to be used for emptying the bag when tilted and a second flap on the opposite end of the bag and in the same plane as the first flap and means anchoring said bag in the box to the bottom wall thereof comprising a channel member, said second flap being wound about said channel member, a bar-like member secured in the groove of the channel member with the underlying portion of the flap pressed in the groove, and a pair of C-shaped members secured to the bottom wall of the box adjacent to opposite side walls, said channel member having its ends inserted in said C-shaped members.

*8. A large plastic bag adapted for the storage and transportation of bulk granular material while positioned within a protective outer container having a discharge opening and a bottom supporting surface for the bag, said bag being sealed at each end and folded to form a pair of oppositely disposed triangularly shaped integral flaps projecting outwardly from each of said ends; means for anchoring a first flap of the bag to the bottom supporting surface of the container comprising a channel member having said first flap wound thereabout and means for retaining the wound flap against said channel member; means carried by said container for securing the channel member and said first flap pressed thereagainst to the bottom supporting surface of the container at the location some distance from the discharge opening of the container; a second flap at the opposite end of the bag in the same plane as the first flap but located adjacent the discharge opening of the container and adapted for emptying the bag through said discharge opening; means for securing the said second flap to the bottom surface of the container adjacent to the discharge opening of the container while the bag is being loaded or is storing or transporting said bulk material; a third flap on the same end of the bag as the said second flap, and used for loading the bag; a series of elements arranged to form a grating in the container immediately behind and adjacent the discharge opening of the container and provided with clearances through which each of said second and said third flaps can project; a crossbar positioned in the container near the top of the grating for retaining the said third flap; and means comprising a hopper adapted to be secured to the said second flap for facilitating the unloading of the contents of the bag through said discharge opening when the container with the bag disposed therein is inclined from the horizontal.*

*9. A large plastic bag adapted to contain granular material while disposed in a protective container having a floor and at least one port for charging and discharging said granular material; said bag being closed by weld lines and folded to form a pair of oppositely disposed triangularly shaped integral flaps projecting outwardly; means for anchoring a first flap to the floor of the container comprising a channel member having a flap wound thereabout and means for pressing the wound flap against said channel member; means carried by said container for securing the channel member and said flap pressed thereagainst to the floor of the container; a second flap in the same plane as the first flap and adapted for emptying the bag; means for securing the second flap to the floor of the container adjacent to said port of the container while the bag is being loaded and is storing bulk material; a third flap on the same end of the bag as the emptying flap; a series of elements arranged to form a grating in the container converging said port and providing with a clearance through which loading and unloading flaps project; a cross-bar inserted above the grating for retaining the flap used for loading the bag; and means comprising a hopper secured to the unloading flap for unloading the contents of the bag when the port is open.*

* * * * *